(12) United States Patent
Ferris et al.

(10) Patent No.: US 8,880,700 B2
(45) Date of Patent: Nov. 4, 2014

(54) DELIVERY OF USER-CONTROLLED RESOURCES IN CLOUD ENVIRONMENTS VIA A RESOURCE SPECIFICATION LANGUAGE WRAPPER

(75) Inventors: James Michael Ferris, Cary, NC (US); Gerry Edward Riveros, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 559 days.

(21) Appl. No.: 12/790,294

(22) Filed: May 28, 2010

(65) Prior Publication Data

US 2011/0296023 A1    Dec. 1, 2011

(51) Int. Cl.
G06F 15/16    (2006.01)
G06F 9/50    (2006.01)
G06F 9/54    (2006.01)
G06F 12/00    (2006.01)

(52) U.S. Cl.
CPC .............. *G06F 9/5072* (2013.01); *G06F 9/541* (2013.01)
USPC .......................................... 709/226; 709/203

(58) Field of Classification Search
USPC ................... 709/203, 225–229, 250
See application file for complete search history.

(56) References Cited

U.S. PATENT DOCUMENTS

| | | | |
|---|---|---|---|
| 6,463,457 B1 | 10/2002 | Armentrout et al. | |
| 7,313,796 B2 | 12/2007 | Hamilton et al. | |
| 7,439,937 B2 | 10/2008 | Ben-Shachar et al. | |
| 7,529,785 B1 | 5/2009 | Spertus et al. | |
| 7,546,462 B2 | 6/2009 | Upton | |
| 7,596,620 B1 | 9/2009 | Colton et al. | |
| 7,886,038 B2 * | 2/2011 | Ferris ............................ | 709/223 |
| 8,255,529 B2 * | 8/2012 | Ferris et al. ................... | 709/224 |
| 2001/0039497 A1 | 11/2001 | Hubbard | |
| 2002/0069276 A1 | 6/2002 | Hino et al. | |
| 2002/0165819 A1 | 11/2002 | McKnight et al. | |
| 2003/0013609 A1 | 1/2003 | Burns et al. | |
| 2003/0037258 A1 | 2/2003 | Koren | |
| 2003/0110252 A1 | 6/2003 | Yang-Huffman | |
| 2003/0217096 A1 * | 11/2003 | McKelvie et al. ............ | 709/202 |
| 2004/0162902 A1 | 8/2004 | Davis | |
| 2004/0210591 A1 | 10/2004 | Hirschfeld et al. | |

(Continued)

OTHER PUBLICATIONS

Morgan, "Systems and Methods for Generating Optimized Resource Consumption Periods for Multiple Users on Combined Basis", U.S. Appl. No. 13/037,359, filed Mar. 1, 2011.

(Continued)

*Primary Examiner* — Zarni Maung
(74) *Attorney, Agent, or Firm* — Lowenstein Sandler LLP

(57) ABSTRACT

Embodiments relate to systems and methods for the delivery of user-controlled resources in cloud environments via a resource specification language wrapper. In embodiments, the user of a client machine may wish to contribute resources from that machine to a cloud-based network via a network connection over a limited or defined period. To expose the user-controlled resources to one or more clouds for use the user may transmit a contribution request encoding the user-controlled resources in a specification language wrapper, such as an XML (extensible markup language) wrapper. The specification language wrapper can embed the set of user-controlled resources, such as processor time, memory, and/or other resources, in an XML or other format to transmit to a marketplace engine which can place the set of user-controlled resources into a resource pool, for selection by marketplace clouds. The specification language wrapper can indicate access controls or restrictions on the contributed resources.

19 Claims, 6 Drawing Sheets

(56) References Cited

U.S. PATENT DOCUMENTS

| | | |
|---|---|---|
| 2004/0210627 A1 | 10/2004 | Kroening |
| 2004/0268347 A1 | 12/2004 | Knauerhase et al. |
| 2005/0131898 A1 | 6/2005 | Fatula |
| 2005/0144060 A1 | 6/2005 | Chen et al. |
| 2005/0182727 A1 | 8/2005 | Robert et al. |
| 2005/0289540 A1 | 12/2005 | Nguyen et al. |
| 2006/0075042 A1 | 4/2006 | Wang et al. |
| 2006/0085530 A1 | 4/2006 | Garrett |
| 2006/0085824 A1 | 4/2006 | Bruck et al. |
| 2006/0130144 A1 | 6/2006 | Wernicke |
| 2006/0177058 A1 | 8/2006 | Sarwono et al. |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0215796 A1 | 9/2008 | Lam et al. |
| 2008/0240150 A1 | 10/2008 | Dias et al. |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265707 A1 | 10/2009 | Goodman et al. |
| 2009/0271324 A1 | 10/2009 | Jandhyala et al. |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris |
| 2009/0300635 A1 | 12/2009 | Ferris |
| 2009/0300641 A1 | 12/2009 | Friedman et al. |
| 2009/0300719 A1 | 12/2009 | Ferris |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0125664 A1* | 5/2010 | Hadar et al. ................. 709/224 |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1* | 5/2010 | Ferris ........................... 709/226 |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0220622 A1 | 9/2010 | Wei |
| 2010/0299366 A1 | 11/2010 | Stienhans et al. |
| 2010/0306355 A1* | 12/2010 | Lagergren et al. ............ 709/222 |
| 2011/0016214 A1 | 1/2011 | Jackson |
| 2011/0131335 A1 | 6/2011 | Spaltro et al. |
| 2011/0179134 A1* | 7/2011 | Mayo et al. ................... 709/214 |

OTHER PUBLICATIONS

Morgan, "Systems and Methods for Metering Cloud Resource Consumption Using Multiple Hierarchical Subscription Periods", U.S. Appl. No. 13/037,360, filed Mar. 1, 2011.

Morgan, "Systems and Methods for Generating Marketplace Brokerage Exchange of Excess Subscribed Resources Using Dynamic Subscription Periods", U.S. Appl. No. 13/037,351, filed Feb. 28, 2011.

"rBuilder and the rPath Appliance Platform", 2007 rPath, Inc., www.rpath.com, 3 pages.

White Paper—"rPath Versus Other Software Appliance Approaches", Mar. 2008, rPath, Inc., www.rpath.com, 9 pages.

White Paper—"Best Practices for Building Virtual Appliances", 2008 rPath, Inc., www.rpath.com, 6 pages.

DeHaan et al., "Methods and Systems for Flexible Cloud Management with Power Management Support", U.S. Appl. No. 12/473,987, filed May 28, 2009.

Ferris, "Methods and Systems for Providing a Market for User-Controlled Resources to be Provided to a Cloud Computing Environment", U.S. Appl. No. 12/390,617, filed Feb. 23, 2009.

Ferris, "Methods and Systems for Communicating with Third Party Resources in a Cloud Computing Environment", U.S. Appl. No. 12/390,598, filed Feb. 23, 2009.

Ferris, "Systems and Methods for Extending Security Platforms to Cloud-Based Networks", U.S. Appl. No. 12/391,802, filed Feb. 24, 2009.

DeHaan et al., "Methods and Systems for Flexible Cloud Management", U.S. Appl. No. 12/473,041, filed May 27, 2009.

DeHaan et al., "Systems and Methods for Power Management in Managed Network Having Hardware-Based and Virtual Reources", U.S. Appl. No. 12/475,448, filed May 29, 2009.

Ferris, "Methods and Systems for Providing a Universal Marketplace for Resources for Delivery to a Cloud Computing Environment", U.S. Appl. No. 12/475,228, filed May 29, 2009.

DeHaan, "Methods and Systems for Abstracting Cloud Management", U.S. Appl. No. 12/474,113, filed May 28, 2009.

DeHaan, "Methods and Systems for Automated Scaling of Cloud Computing Systems", U.S. Appl. No. 12/474,707, filed May 29, 2009.

DeHaan, "Methods and Systems for Securely Terminating Processes in a Cloud Computing Environment", U.S. Appl. No. 12/550,157, filed Aug. 28, 2009.

DeHaan et al., "Methods and Systems for Flexible Cloud Management Including External Clouds", U.S. Appl. No. 12/551,506, filed Aug. 31, 2009.

DeHaan, "Methods and Systems for Abstracting Cloud Management to Allow Communication Between Independently Controlled Clouds", U.S. Appl. No. 12/551,096, filed Aug. 31, 2009.

DeHaan, "Methods and Systems for Automated Migration of Cloud Processes to External Clouds", U.S. Appl. No. 12/551,459, filed Aug. 31, 2009.

Ferris et al., "Methods and Systems for Pricing Software Infrastructure for a Cloud Computing Environment", U.S. Appl. No. 12/551,517, filed Aug. 31, 2009.

Ferris et al., "Methods and Systems for Metering Software Infrastructure in a Cloud Computing Environment", U.S. Appl. No. 12/551,514, filed Aug. 31, 2009.

DeHaan et al., "Systems and Methods for Secure Distributed Storage", U.S. Appl. No. 12/610,081, filed Oct. 30, 2009.

Ferris et al., "Methods and Systems for Monitoring Cloud Computing Environments", U.S. Appl. No. 12/627,764, filed Nov. 30, 2009.

Ferris et al., "Methods and Systems for Detecting Events in Cloud Computing Environments and Performing Actions Upon Occurrence of the Events", U.S. Appl. No. 12/627,646, filed Nov. 30, 2009.

(56) References Cited

OTHER PUBLICATIONS

Ferris et al., "Methods and Systems for Verifying Software License Compliance in Cloud Computing Environments", U.S. Appl. No. 12/627,643, filed Nov. 30, 2009.

Ferris et al., "Systems and Methods for Service Aggregation Using Graduated Service Levels in a Cloud Network", U.S. Appl. No. 12/628,112, filed Nov. 30, 2009.

Ferris et al., "Methods and Systems for Generating a Software License Knowledge Base for Verifying Software License Compliance in Cloud Computing Environments", U.S. Appl. No. 12/628,156, filed Nov. 30, 2009.

Ferris et al., "Methods and Systems for Converting Standard Software Licenses for Use in Cloud Computing Environments", U.S. Appl. No. 12/714,099, filed Feb. 26, 2010.

Ferris et al., "Systems and Methods for Managing a Software Subscription in a Cloud Network", U.S. Appl. No. 12/714,096, filed Feb. 26, 2010.

Ferris et al., "Methods and Systems for Providing Deployment Architectures in Cloud Computing Environments", U.S. Appl. No. 12/714,427, filed Feb. 26, 2010.

Ferris et al., "Methods and Systems for Matching Resource Requests with Cloud Computing Environments", U.S. Appl. No. 12/714,113, filed Feb. 26, 2010.

Ferris et al., "Systems and Methods for Generating Cross-Cloud Computing Appliances", U.S. Appl. No. 12/714,315, filed Feb. 26, 2010.

Ferris et al., "Systems and Methods for Cloud-Based Brokerage Exchange of Software Entitlements", U.S. Appl. No. 12/714,302, filed Feb. 26, 2010.

Ferris et al., "Methods and Systems for Offering Additional License Terms During Conversion of Standard Software Licenses for Use in Cloud Computing Environments", U.S. Appl. No. 12/714,065, filed Feb. 26, 2010.

Ferris et al., "Systems and Methods for or a Usage Manager for Cross-Cloud Appliances", U.S. Appl. No. 12/714,334, filed Feb. 26, 2010.

Ferris et al., "Systems and Methods for Managing Multi-Level Service Level Agreements in Cloud-Based Networks", U.S. Appl. No. 12/789,660, filed May 28, 2010.

Ferris et al., "Methods and Systems for Generating Cross-Mapping of Vendor Software in a Cloud Computing Environment", U.S. Appl. No. 12/790,527, filed May 28, 2010.

Ferris et al., "Methods and Systems for Cloud Deployment Analysis Featuring Relative Cloud Resource Importance", U.S. Appl. No. 12/790,366, filed May 28, 2010.

Ferris et al., "Systems and Methods for Generating Customized Build Options for Cloud Deployment Matching Usage Profile Against Cloud Infrastructure Options", U.S. Appl. No. 12/789,701, filed May 28, 2010.

Ferris et al., "Systems and Methods for Exporting Usage History Data as Input to a Management Platform of a Target Cloud-Based Network", U.S. Appl. No. 12/790,415, filed May 28, 2010.

Ferris et al., "Systems and Methods for Cross-Vendor Mapping Service in Cloud Networks", U.S. Appl. No. 12/790,162, filed May 28, 2010.

Ferris et al., "Systems and Methods for Cross-Cloud Vendor Mapping Service in a Dynamic Cloud Marketplace", U.S. Appl. No. 12/790,229, filed May 28, 2010.

Ferris et al., "Systems and Methods for Aggregate Monitoring of Utilization Data for Vendor Products in Cloud Networks", U.S. Appl. No. 12/790,039, filed May 28, 2010.

Ferris, et al., "Systems and Methods for Cominatorial Optimization of Multiple Resources Across a Set of Cloud-Based Networks", U.S. Appl. No. 12/953,718, filed Nov. 24, 2010.

Ferris et al., "Systems and Methods for Matching a Usage History to a New Cloud", U.S. Appl. No. 12/953,757, filed Nov. 24, 2010.

Ferris et al., "Systems and Methods for Identifying Usage Histories for Producing Optimized Cloud Utilization", U.S. Appl. No. 12/952,930, filed Nov. 23, 2010.

Ferris et al., "Systems and Methods for Identifying Service Dependencies in a Cloud Deployment", U.S. Appl. No. 12/952,857, filed Nov. 23, 2010.

Ferris et al., "Systems and Methods for Migrating Subscribed Services in a Cloud Deployment", U.S. Appl. No. 12/955,277, filed Nov. 29, 2010.

Ferris et al., "Systems and Methods for Migrating Subscribed Services from a Set of Clouds to a Second Set of Clouds", U.S. Appl. No. 12/957,281, filed Nov. 30, 2010.

Morgan, "Systems and Methods for Generating Multi-Cloud incremental Billing Capture and Administration", U.S. Appl. No. 12/954,323, filed Nov. 24, 2010.

Morgan, "Systems and Methods for Aggregating Marginal Subscription Offsets in a Set of Multiple Host Clouds", U.S. Appl. No. 12/954,400, filed Nov. 24, 2010.

Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.

Morgan, "Systems and Methods for Managing Subscribed Resource Limits in Cloud Network Using Variable or Instantaneous Consumption Tracking Periods", U.S. Appl. No. 12/954,352, filed Nov. 24, 2010.

Ferris et al., "Systems and Methods for Migrating Software Modules into One or More Clouds", U.S. Appl. No. 12/952,701, filed Nov. 23, 2010.

Ferris et al., "Systems and Methods for Brokering Optimized Resource Supply Costs in Host Cloud-Based Network Using Predictive Workloads", U.S. Appl. No. 12/957,274, filed Nov. 30, 2010.

Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.

Morgan, "Systems and Methods for Detecting Resource Consumption Events Over Sliding Intervals in Cloud-Based Network", U.S. Appl. No. 13/149,235, filed May 31, 2011.

Morgan, "Systems and Methods for Triggering Workload Movement Based on Policy Stack Having Multiple Selectable Inputs", U.S. Appl. No. 13/149,418, filed May 31, 2011.

Morgan, "Systems and Methods for Cloud Deployment Engine for Selective Workload Migration or Federation Based on Workload Conditions", U.S. Appl. No. 13/117,937, filed May 27, 2011.

Morgan, "Systems and Methods for Tracking Cloud Installation Information Using Cloud-Aware Kernel of Operating System", U.S. Appl. No. 13/149,750, filed May 31, 2011.

Morgan, "Systems and Methods for Introspective Application Reporting to Facilitate Virtual Machine Movement Between Cloud Hosts", U.S. Appl. No. 13/118,009, filed May 27, 2011.

Morgan, "Systems and Methods for Self-Moving Operating System Installation in Cloud-Based Network", U.S. Appl. No. 13/149,877, filed May 31, 2011.

* cited by examiner

DELIVERY OF USER-CONTROLLED RESOURCES IN CLOUD ENVIRONMENTS VIA A RESOURCE SPECIFICATION LANGUAGE WRAPPER

FIELD

The invention relates generally to systems and methods for the delivery of user-controlled resources in cloud environments via a resource specification language wrapper, and more particularly, to platforms and techniques for receiving a contribution request from a user of a client machine to contribute resources of that machine to one or more clouds, encapsulating that request in a specification language wrapper, and transmitting that request to a cloud marketplace system to decode and make those resources available to support those clouds.

BACKGROUND

The advent of cloud-based computing architectures has opened new possibilities for the rapid and scalable deployment of virtual Web stores, media outlets, social networking sites, and many other on-line sites or services. In general, a cloud-based architecture deploys a set of hosted resources such as processors, operating systems, software and other components that can be combined together to form virtual machines. A user or customer can request the instantiation of a virtual machine or set of machines from those resources from a central server or cloud management system to perform intended tasks, services, or applications. For example, a user may wish to set up and instantiate a virtual server from the cloud to create a storefront to market products or services on a temporary basis, for instance, to sell tickets to or merchandise for an upcoming sports or musical performance. The user can subscribe to the set of resources needed to build and run the set of instantiated virtual machines on a comparatively short-term basis, such as hours or days, for their intended application.

In various cloud-based architectures, the cloud may be configured with a cloud marketplace system or engine which permits users of home, laptop, and/or other client machines to connect to the cloud and make the resources of that machine available for use by the cloud, in a controlled fashion. For instance, the user of a home computer may choose to allow that machine to remain powered up overnight, and to allow one or more cloud networks to extract processing power, memory allocations, and/or other resources for use by the cloud on a limited basis. In aspects, a cloud arrangement in which hardware, software, and/or other resources can be accepted from public users who choose to contribute their own user-controlled resources to the cloud can be referred to as a "cloud marketplace system." In some cloud marketplace systems, the intake and distribution of user-controlled resources can be conducted using a bid system, in which cloud providers may bid or offer to use resources made available by users. A bid for use of resources can consist of a payment, and/or other remuneration, such as, for example, an offer for the user of cloud applications or services at a later time.

In existing cloud marketplace systems or other deployment systems of a contributory nature, no mechanism, format, or standard exists by which a user can specify the resources they wish to offer or deliver for use. Different contribution requests may therefore differ or be incompatible across different cloud providers, and in addition no capability exists to specify the access control features a user wishes to apply to the resources being delivered to the cloud. It may be desirable to provide systems and methods for the delivery of user-controlled resources in cloud environments via a resource specification language wrapper, in which resource contribution requests, access controls, and other data can be encoded and transmitted in a standardized or commonly compatible or decodable specification language wrapper, to a cloud marketplace system for decoding and deployment of user-controlled resources.

DESCRIPTION

Figure 1:
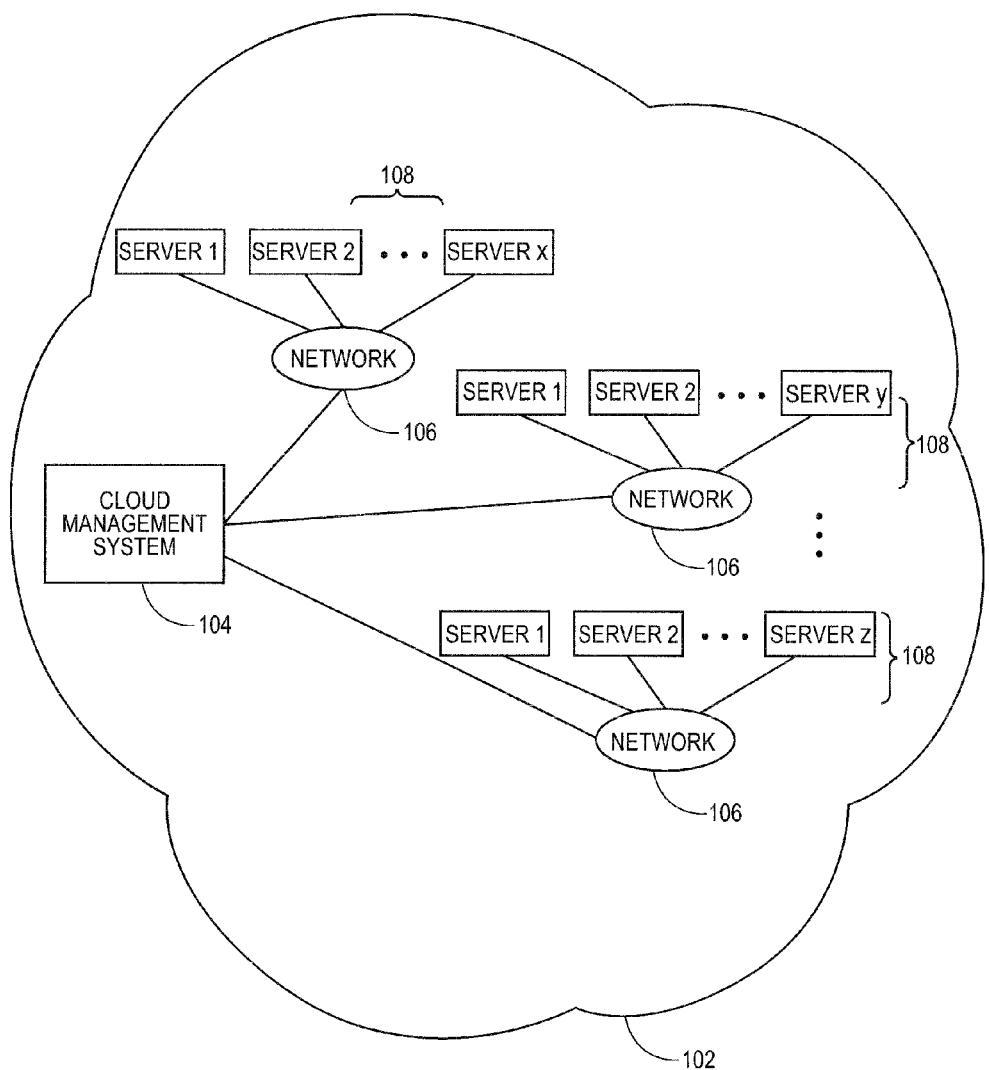
FIG. 1 illustrates an overall cloud system architecture in which various aspects of systems and methods for the delivery of user-controlled resources in cloud environments via a resource specification language wrapper can be practiced, according to embodiments.

Embodiments described herein can be implemented in or supported by a cloud network architecture. As used herein, a "cloud" can comprise a collection of hardware, software, services, and/or resources that can be invoked to instantiate a virtual machine, process, or other resource for a limited or defined duration. As shown for example in FIG. 1, the collection of resources supporting a cloud 102 can at a hardware level comprise a set of resource servers 108 configured to deliver computing components needed to instantiate a virtual machine, process, service, or other resource. For example, one group of resource servers in set of resource servers 108 can host and serve an operating system, and/or components, utilities, or interfaces related to that operating system, to deliver to a virtual target, and instantiate that machine with an image of that operating system. Another group of servers in set of resource servers 108 can accept requests to host computing cycles or processor time, memory allocations, communications ports or links, and/or other resources to supply a defined level of processing power or throughput for a virtual machine. A further group of resource servers in set of resource servers 108 can host and serve applications or other software to load on an instantiation of a virtual machine, such as an email client, a browser application, a messaging application, or other applications, software, or services. Other types of resource servers can be used to support one or more clouds 102.

In embodiments, the entire set of resource servers 108 and/or other hardware or software resources used to support one or more clouds 102, along with the set of instantiated virtual machines, can be managed by a cloud management system 104. The cloud management system 104 can comprise a dedicated or centralized server and/or other software, hardware, services, and network tools that communicate via network 106, such as the Internet or other public or private network, with all servers in set of resource servers 108 to manage the cloud 102 and its operation. To instantiate a new or updated set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The virtual machines can be instantiated as virtual client machines, virtual appliance machines consisting of special-purpose or dedicated-task machines as understood in the art, and/or as other virtual machines or entities. The request to invoke and instantiate the desired complement of virtual machines can be received and processed by the cloud management system 104, which identifies the type of virtual machine, process, or other resource being requested in that platform's associated cloud. The cloud management system 104 can then identify the collection of hardware, software, service, and/or other resources necessary to instantiate that complement of virtual machines or other resources. In embodiments, the set of instantiated virtual machines or other resources can, for example, and as noted, comprise virtual transaction servers used to support Web storefronts, Web pages, and/or other transaction sites.

In embodiments, the user's instantiation request can specify a variety of parameters defining the operation of the set of virtual machines to be invoked. The instantiation request, for example, can specify a defined period of time for which the instantiated collection of machines, services, or processes is needed. The period of time can be, for example, an hour, a day, a month, or other interval of time. In embodiments, the user's instantiation request can specify the instantiation of a set of virtual machines or processes on a task basis, rather than for a predetermined amount or interval of time. For instance, a user could request a set of virtual provisioning servers and other resources until a target software update is completed on a population of corporate or other machines. The user's instantiation request can in further regards specify other parameters that define the configuration and operation of the set of virtual machines or other instantiated resources. For example, the request can specify a specific minimum or maximum amount of processing power or input/output (I/O) throughput that the user wishes to be available to each instance of the virtual machine or other resource. In embodiments, the requesting user can for instance specify a service level agreement (SLA) acceptable for their desired set of applications or services. Other parameters and settings can be used to instantiate and operate a set of virtual machines, software, and other resources in the host clouds. One skilled in the art will realize that the user's request can likewise include combinations of the foregoing exemplary parameters, and others. It may be noted that "user" herein can include a network-level user or subscriber to cloud-based networks, such as a corporation, government entity, educational institution, and/or other entity, including individual users and groups of users.

When the request to instantiate a set of virtual machines or other resources has been received and the necessary resources to build those machines or resources have been identified, the cloud management system 104 can communicate with one or more set of resource servers 108 to locate resources to supply the required components. Generally, the cloud management system 104 can select servers from the diverse set of resource servers 108 to assemble the various components needed to build the requested set of virtual machines, services, or other resources. It may be noted that in some embodiments, permanent storage, such as optical storage or hard disk arrays, may or may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in one or more clouds 102 can be accessed and leveraged as needed. For example, other software or services that are provided outside of one or more clouds 102 acting as hosts, and are instead hosted by third parties outside the boundaries of those clouds, can be invoked by in-cloud virtual machines or users. For further example, other non-cloud hardware and/or storage services can be utilized as an extension to the one or more clouds 102 acting as hosts or native clouds, for instance, on an on-demand, subscribed, or event-triggered basis.

With the resource requirements identified for building a network of virtual machines, the cloud management system 104 can extract and build the set of virtual machines or other resources on a dynamic, on-demand basis. For example, one set of resource servers 108 may respond to an instantiation request for a given quantity of processor cycles with an offer to deliver that computational power immediately and guaranteed for the next hour or day. A further set of resource servers 108 can offer to immediately supply communication bandwidth, for example on a guaranteed minimum or best-efforts basis, for instance over a defined window of time. In other embodiments, the set of virtual machines or other resources can be built on a batch basis, or at a particular future time. For example, a set of resource servers 108 may respond to a request for instantiation of virtual machines at a programmed time with an offer to deliver the specified quantity of processor cycles within a specific amount of time, such as the next 12 hours. Other timing and resource configurations are possible.

After interrogating and receiving resource commitments from the set of resource servers 108, the cloud management system 104 can select a group of servers in the set of resource servers 108 that match or best match the instantiation request for each component needed to build the user's requested virtual machine, service, or other resource. The cloud management system 104 for the one or more clouds 102 acting as the destination for the virtual machines can then coordinate the integration of the identified group of servers from the set of resource servers 108, to build and launch the requested set of virtual machines or other resources. The cloud management system 104 can track the identified group of servers selected from the set of resource servers 108, or other distributed resources that are dynamically or temporarily combined, to produce and manage the requested virtual machine population, services, or other cloud-based resources.

In embodiments, the cloud management system 104 can generate a resource aggregation table or other record that identifies the various selected sets of resource servers in set of resource servers 108 that will be used to supply the components of the set of instantiated virtual machines, services, or processes. The selected sets of resource servers can be identified by unique identifiers such as, for instance, Internet protocol (IP) addresses or other addresses. In aspects, different sets of servers in set of resource servers 108 can be selected to deliver different resources to different users and/or for different applications. The cloud management system 104 can register the finalized group of servers in the set resource servers 108 contributing to or otherwise supporting the set of instantiated machines, services, or processes.

The cloud management system 104 can then set up and launch the initiation process to instantiate the virtual machines, processes, services, and/or other resources to be hosted and delivered from the one or more clouds 102. The cloud management system 104 can for instance transmit an instantiation command or instruction to the registered group of servers in the set of resource servers 108. The cloud management system 104 can receive a confirmation message back from each registered server in set of resource servers 108 indicating a status or state regarding the provisioning of their respective resources. Various registered resource servers may confirm, for example, the availability of a dedicated amount of processor cycles, amounts of electronic memory, communications bandwidth, services, and/or applications or other software prepared to be served and delivered.

Figure 2:
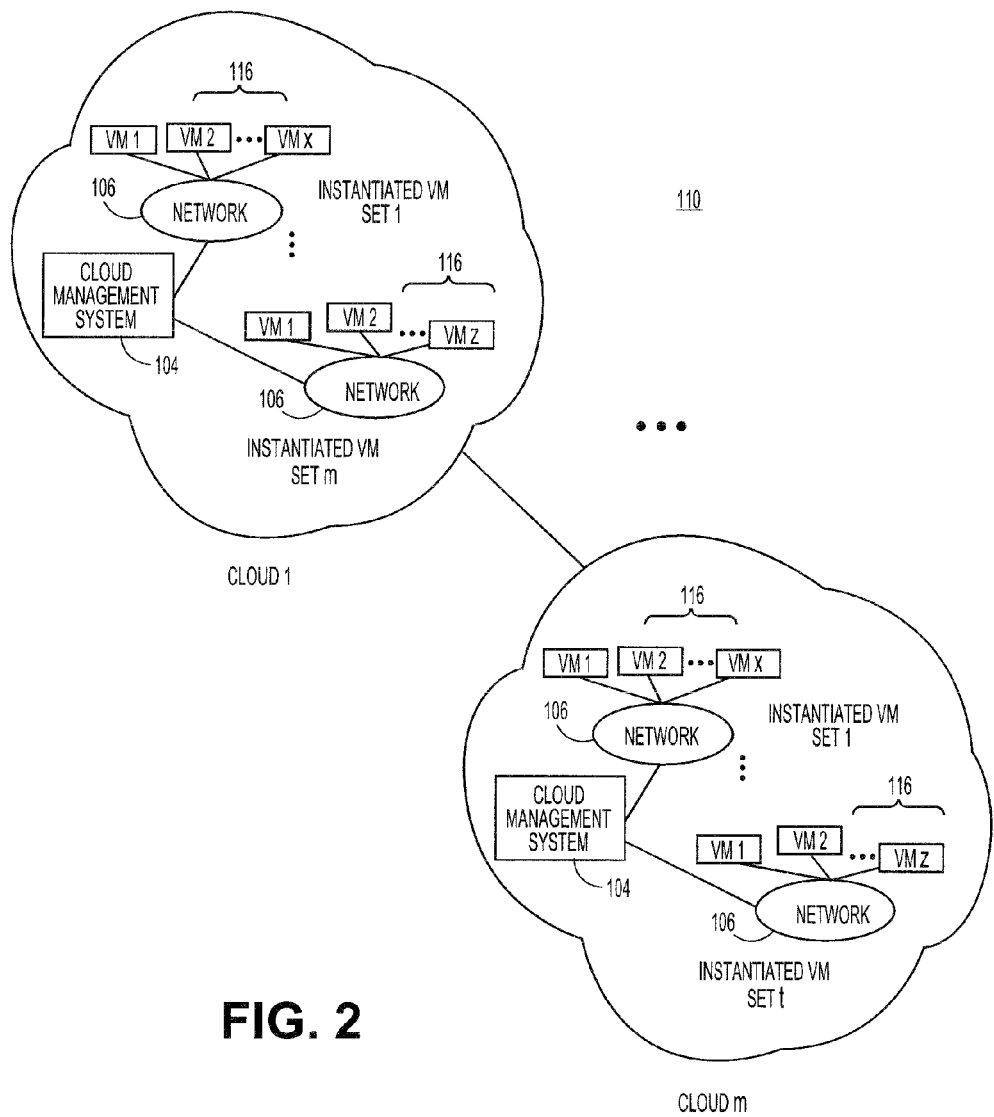
FIG. 2 illustrates an overall cloud system architecture in which various aspects of systems and methods for the delivery of user-controlled resources in cloud environments via a resource specification language wrapper can be practiced, in further regards.

As shown for example in FIG. 2, after coordination of the sources and configuration of resources including the hardware layer, selected software, and/or other resources, the cloud management system 104 can then instantiate a set of virtual machines 116, and/or other appliances, services, processes, and/or entities, based on the resources supplied by servers within set of resource servers 108 registered to support the one or more clouds 102 in a multiple-cloud network 110. According to aspects, cloud management system 104 can access or interact with a virtualization module, platform, or service to instantiate and operate set of virtual machines 116, such as the kernel-based virtualization manager (KVM™) available from Red Hat, Inc. of Raleigh, N.C., or others. In embodiments, the cloud management system 104 can instantiate a given number, for example, 10, 500, 1000, 20,000, or other numbers or instances of virtual machines to populate one or more clouds 102 and be made available to users of that cloud or clouds. In aspects, users may access the one or more clouds 102 via the Internet, or other public or private networks. Each virtual machine can be assigned an instantiated machine ID that can be stored in the resource aggregation table, or other record or image of the instantiated virtual machine population. Additionally, the cloud management system 104 can store data related to the duration of the existence or operation of each operating virtual machine, as well as the collection of resources utilized by the overall set of instantiated virtual machines 116.

In embodiments, the cloud management system 104 can further store, track and manage each user's identity and associated set of rights or entitlements to software, hardware, and other resources. Each user that operates a virtual machine or service in the set of virtual machines in the cloud can have specific rights and resources assigned and made available to them, with associated access rights and security provisions. The cloud management system 104 can track and configure specific actions that each user can perform, such as the ability to provision a set of virtual machines with software applications or other resources, configure a set of virtual machines to desired specifications, submit jobs to the set of virtual machines or other host, manage other users of the set of instantiated virtual machines 116 or other resources, and/or other privileges, entitlements, or actions. The cloud management system 104 associated with the virtual machine(s) of each user can further generate records of the usage of instantiated virtual machines to permit tracking, billing, and auditing of the resources and services consumed by the user or set of users. In aspects of the present teachings, the tracking of usage activity for one or more user (including network level user and/or end-user) can be abstracted from any one cloud to which that user is registered, and made available from an external or independent usage tracking service capable of tracking software and other usage across an arbitrary collection of clouds, as described herein. In embodiments, the cloud management system 104 of an associated cloud can for example meter the usage and/or duration of the set of instantiated virtual machines 116, to generate subscription and/or billing records for a user that has launched those machines. In aspects, tracking records can in addition or instead be generated by an internal service operating within a given cloud. Other subscription, billing, entitlement and/or value arrangements are possible.

The cloud management system 104 can configure each virtual machine in set of instantiated virtual machines 116 to be made available to users via one or more networks 116, such as the Internet or other public or private networks. Those users can for instance access set of instantiated virtual machines via a browser interlace, via an application server such as a Java™ server, via an application programming interface (API), and/or other interface or mechanism. Each instantiated virtual machine in set of instantiated virtual machines 116 can likewise communicate with its associated cloud management system 104 and the registered servers in set of resource servers 108 via a standard Web application programming interface (API), or via other calls, protocols, and/or interfaces. The set of instantiated virtual machines 116 can likewise communicate with each other, as well as other sites, servers, locations, and resources available via the Internet or other public or private networks, whether within a given cloud in one or more clouds 102, or between those or other clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the one or more clouds 102. In embodiments, the set of virtual machines 116 or other services, machines, or resources may not depend in any degree on or require the user's own on-premise hardware or other resources. In embodiments, a user can therefore request and instantiate a set of virtual machines or other resources on a purely off-premise basis, for instance to build and launch a virtual storefront, messaging site, and/or any other application. Likewise, one or more clouds 102 can also be formed in whole or part from resources hosted or maintained by the users of those clouds, themselves.

Because the cloud management system 104 in one regard specifies, builds, operates and manages the set of instantiated virtual machines 116 on a logical or virtual level, the user can request and receive different sets of virtual machines and other resources on a real-time or near real-time basis, without a need to specify, install, or configure any particular hardware. The user's set of instantiated virtual machines 116, processes, services, and/or other resources can in one regard therefore be scaled up or down immediately or virtually immediately on an on-demand basis, if desired. In embodiments, the set of resource servers 108 that are accessed by the cloud management system 104 to support the set of instantiated virtual machines 116 or processes can change or be substituted, over time. The type and operating characteristics of the set of instantiated virtual machines 116 can nevertheless remain constant or virtually constant, since instances are assembled from a collection of abstracted resources that can be selected and maintained from diverse sources based on uniform specifications. Conversely, the users of the set of instantiated virtual machines 116 can also change or update the resource or operational specifications of those machines at any time. The cloud management system 104 and/or other logic can then adapt the allocated resources for that population of virtual machines or other entities, on a dynamic basis.

In terms of network management of the set of instantiate virtual machines 116 that have been successfully configured and instantiated, the one or more cloud management systems 104 associated with those machines can perform various network management tasks including security, maintenance, and metering for billing or subscription purposes. The cloud management system 104 of one or more clouds 102 can, for example, install, initiate, suspend, or terminate instances of applications or appliances on individual machines. The cloud management system 104 can similarly monitor one or more operating virtual machines to detect any virus or other rogue process on individual machines, and for instance terminate an application identified as infected, or a virtual machine detected to have entered a fault state. The cloud management system 104 can likewise manage the set of instantiated virtual machines 116 or other resources on a network-wide or other collective basis, for instance, to push the delivery a software upgrade to all active virtual machines or subsets of machines. Other network management processes can be carried out by cloud management system 104 and/or other associated logic.

In embodiments, more than one set of virtual machines can be instantiated in a given cloud at the same time, at overlapping times, and/or at successive times or intervals. The cloud management system 104 can, in such implementations, build, launch and manage multiple sets of virtual machines as part of the set of instantiated virtual machines 116 based on the same or different underlying set of resource servers 108, with populations of different virtual machines such as may be requested by the same or different users. The cloud management system 104 can institute and enforce security protocols in one or more clouds 102 hosting one or more sets of virtual machines. Each of the individual sets or subsets of virtual machines in the set of instantiated virtual machines 116 can be hosted in a respective partition or sub-cloud of the resources of the main cloud 102. The cloud management system 104 of one or more clouds 102 can for example deploy services specific to isolated or defined sub-clouds, or isolate individual workloads/processes within the cloud to a specific sub-cloud or other sub-domain or partition of the one or more clouds 102 acting as host. The subdivision of one or more clouds 102 into distinct transient sub-clouds, sub-components, or other subsets which have assured security and isolation features can assist in establishing a multiple user or multi-tenant cloud arrangement. In a multiple-user scenario, each of the multiple users can use the cloud platform as a common utility while retaining the assurance that their information is secure from other users of the same one or more clouds 102. In further embodiments, sub-clouds can nevertheless be configured to share resources, if desired.

In embodiments, and as also shown in FIG. 2, the set of instantiated virtual machines 116 generated in a first cloud in one or more clouds 102 can also interact with a set of instantiated virtual machines, services, and/or processes generated in a second, third or further cloud in one or more clouds 102, comprising a multiple-cloud network 110. The cloud management system 104 of a first cloud of one or more clouds 102 can interface with the cloud management system 104 of a second, third, or further cloud of one or more clouds 102 to coordinate those domains and operate the clouds and/or virtual machines, services, and/or processes on a combined basis. The cloud management system 104 of a given cloud on one or more clouds 102 can in aspects track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, government, and/or other entity. In embodiments, the user can be or include another virtual machine, application, service and/or process. In further embodiments, multiple users or entities can share the use of a set of virtual machines or other resources.

Figure 3:
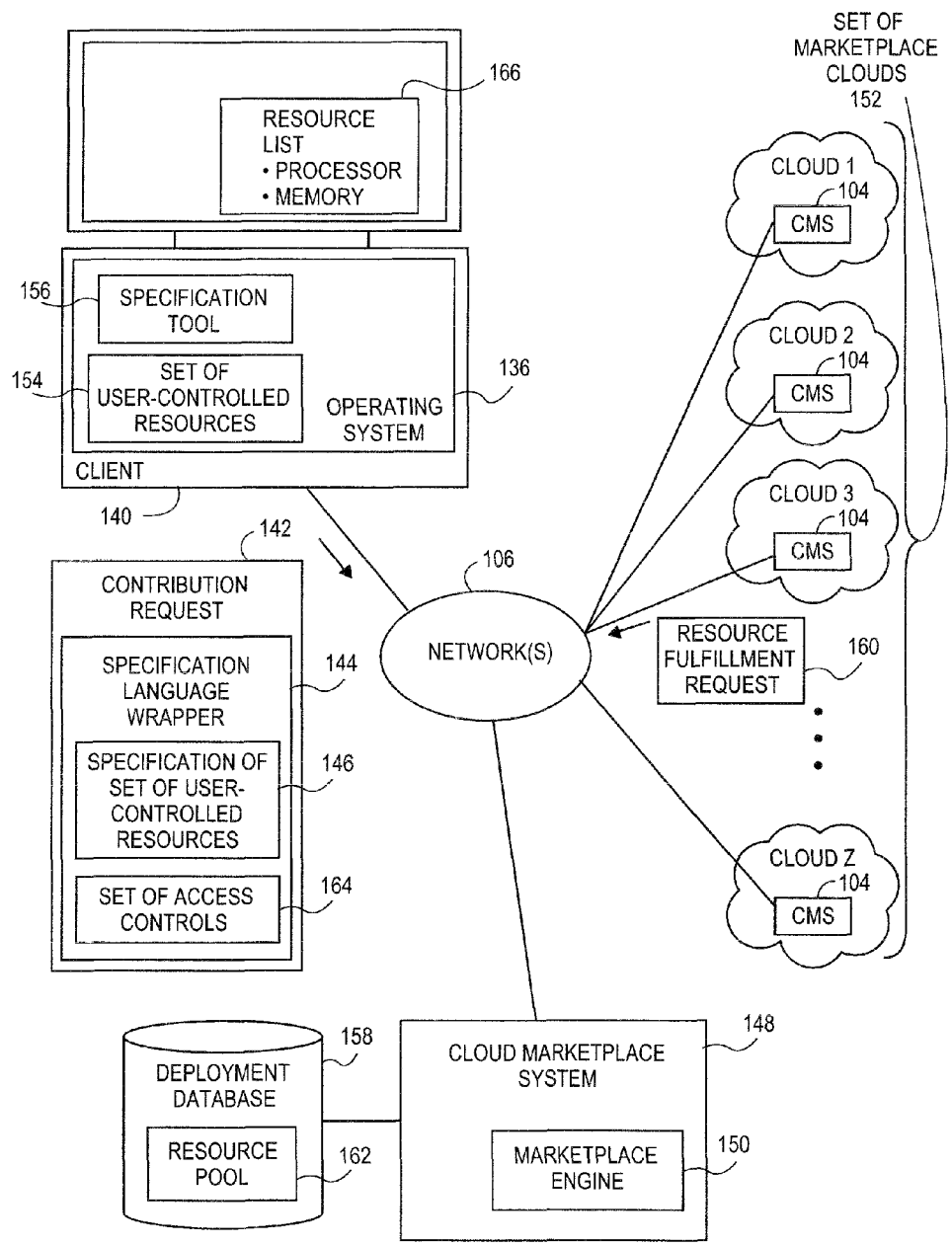
FIG. 3 illustrates a network configuration in which a specification language wrapper for a resource contribution request can be generated, according to various embodiments.

FIG. 3 illustrates an exemplary network 200 in which systems and methods for the delivery of user-controlled resources in cloud environments via a resource specification language wrapper can be implemented, according to various embodiments. In embodiments as shown, a client 140 can communicate with a set of marketplace clouds 152 via one or more networks 106 and a cloud marketplace system 148, such as the Internet or other public or private networks. In aspects as shown, the cloud marketplace system 148 can be or include a marketplace engine 150, such as a database engine and/or related logic. The cloud marketplace system 148 can control the delivery and removal of resources to a set of marketplace clouds 152. In general, a user of the client 140 can wish to contribute a set of user-controlled resources 154 of the client to the set of marketplace clouds 152 via the cloud marketplace system 148. The cloud marketplace system 148 can, in general, match the set of user-controlled resources 154 to be contributed by the client 140 and/or other machines to the set of marketplace clouds 152, based for instance on a resource fulfillment request 160 received from the set of marketplace clouds 152. In aspects, the resource fulfillment request 160 can specify hardware, software, and/or other resources that one or more clouds in the set of marketplace clouds 152 wish to obtain, use, register, and/or secure to support their cloud operations. The resources requested by the set of marketplace clouds 152 can, for instance, be or include hardware resources such as a specified amount of processing time, cycles, and/or throughput, a specified amount or type of memory, and/or a specified amount or type of storage. The resources requested by the set of marketplace clouds 152 can likewise, for instance, be or include software resources such as applications, communications resources such as ports or channels, services such as Web-based identity management or security services, and/or other resources to support the set of marketplace clouds 152. In embodiments, the resources identified in the resource fulfillment request 160 can supplement the resources obtained or extracted from the set of resource servers 108 that may be otherwise supporting each cloud in the set of marketplace clouds, on a temporary, on-demand, and/or other comparatively short-term or limited basis. In embodiments, one or more of the set of marketplace clouds 152 can also be configured and instantiated entirely from client 140 and other machines which choose to contribute a set of user-controlled resources 154, from home computers, laptops, corporate networks, and/or other clients, hosts, and/or machines.

In embodiments as shown, the client 140 can host the set of user-controlled resources 154, again such as processor, memory, storage, communications or Input/Output (I/O), application, operating system, and/or other hardware or software resources. In aspects, the user of the client 140 may choose to contribute some or all of the set of user-controlled resources 154 to the cloud marketplace system 148 to expose, make available, and/or otherwise permit the use or exploitation of those resources by one or more clouds in the set of marketplace clouds 152. In aspects, the user of client 140 may choose to provide the set of user-controlled resources 154 to the set of marketplace clouds 152 during chosen periods of time such as idle, off-peak, and/or other periods of time, such as, merely for example, from 9:00 p.m. to 6:00 a.m. during weekdays for a personal users, or during weekend or holiday days for a corporate user. Other periods of time can be used. In embodiments, the process of contributing the set of user-controlled resources 154 to the set of marketplace clouds 152 can be scheduled or triggered based on other conditions, such as the entry of client 140 into a sleep mode, the decrease below a specified utilization percentage of the processor of the client 140, and/or other conditions or criteria. In aspects, the contribution of the set of user-controlled resources 154 can also be made on a manual basis based on user input, and/or on an automated or scheduled basis.

In aspects as shown, the contribution of some or all of the set of user-controlled resources 154 to the set of marketplace clouds 152 can be initiated by or incorporated in the transmission of a contribution request 142 from the client 140 to the cloud marketplace system 148. In embodiments, the user can select or specify the set of user-controlled resources 154 via a resource list 166 presented by the specification tool 156, which can interact with an operating system of client 140 to produce a list of the hardware, software, and/or other resources present on the client 140. In aspects, the specification tool 156 can be configured to communicate with the cloud marketplace system 148 via one or more networks 106, for instance on a secure basis. The cloud marketplace system 148 can itself be configured with the client 140 and/or other machines, such as similar clients, servers, hosts, and/or other devices or machines, via one or more networks 106 and/or other connections or channels, to access a population of potential resources.

In aspects, the contribution request 142 can again be initiated based on user input via the specification tool 156 on the client 140, and/or can be initiated or transmitted on an automated or programmed basis from a platform or service, such as a scheduling module in the specification tool 156 or a cloud-based service. In aspects as generally shown, the contribution request 142 can be or include a specification language wrapper 144 which embeds or encodes an identification of the set of user-controlled resources 154. In aspects, the specification language wrapper 144 can encapsulate the specification of set of user-controlled resources 146 in a self-describing data format such as extensible markup language (XML) to identify to the cloud marketplace system 148 those hardware, software, and/or other resources which are requested to be made available to the set of marketplace clouds 152 to instantiate and/or support those clouds, their constituent virtual machines, and/or other elements of the set of marketplace clouds 152. For instance, specification language wrapper 144 can encapsulate delimited fields or other data structures that record data such as "Machine ID=9108NH", "Processor=50% contribution", "Memory=2.0 GB contribution", and/or other fields, objects, and/or values, for instance in extensible markup language (XML) or other format.

After receipt of the specification language wrapper 144, in embodiments, the cloud marketplace system 148 can extract or decode the specification of set of user-controlled resources 146 recorded therein, and place the specification of set of user-controlled resources 146 into a resource pool 162 for the set of marketplace clouds 152. In embodiments, the cloud marketplace system 148 can then match the set of user-controlled resources 154 with demands for resources expressed in the resource fulfillment request 160 from one or more clouds of the set of marketplace clouds 152. For instance, a cloud requesting a specified amount of processing cycles or throughput coupled with a specified amount of memory can obtain and register the set of user-controlled resources 154 for a specified interval of time, such as over night hours or other periods of time. In aspects, the user of client 140 can be compensated by the cloud marketplace system 148, the set of marketplace clouds 152, and/or other entities for the contribution of the set of user-controlled resources 154 to the set of marketplace clouds 152, for instance, by a payment or credit to the user of the client 140, by the delivery of goods or services such as software, and/or other exchanges of value. In aspects, the user of the client 140 can agree to contribute the set of user-controlled resources 154 to the set of marketplace clouds 152 on a donated or uncompensated basis.

In aspects, and as shown, the user can include a set of access controls 164 in the contribution request 142 and/or the specification language wrapper 144. The set of access controls 164 can specify, for instance, restrictions or conditions on the user of the set of user-controlled resources 154 by the set of marketplace clouds 152. For instance, the set of access controls 164 can specify or stipulate that the memory of the client 140, will be protected from use within certain memory address ranges, and/or that hard disk storage, will only be permitted in certain amounts or directory locations. Other access limitations or controls can be incorporated in the set of access controls 164.

Figure 4:
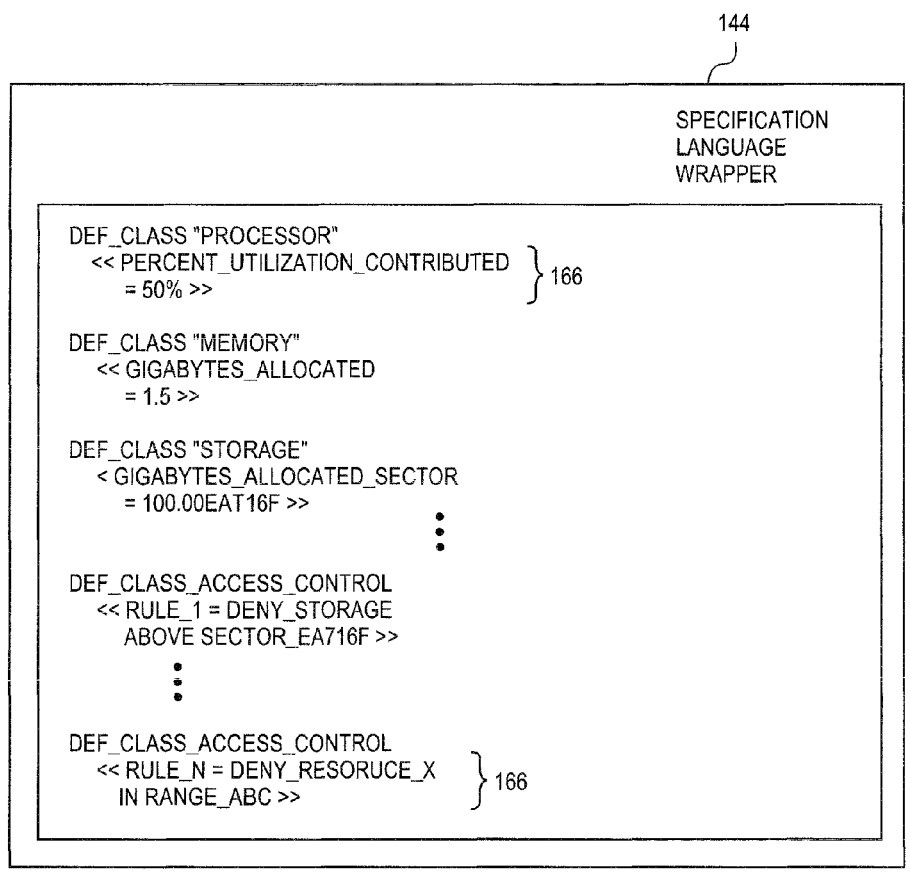
FIG. 4 illustrates an exemplary hardware configuration for a cloud management system that can support and maintain one or more cloud-based networks, according to various embodiments.

FIG. 4 illustrates an exemplary data structure, of the specification language wrapper 144 that can be used to transmit the specification of set of user-controlled resources 146 and/or other data to the cloud marketplace system 148, to initiate a contribution request 142 and/or other command or action. In aspects as shown, the specification language wrapper 144 can comprise a set of encoded or delimited data fields 166, such as the delimiters of an extensible markup language (XML) file or other datagram. In aspects, the cloud marketplace system 148 can encode the resource pool 162 for the set of marketplace clouds 152 in the same wrapper format, such as extensible markup language (XML) format, as the specification language wrapper 144. The insertion and accessing of the specification of set of user-controlled resources 146 extracted from the specification language wrapper 144 directly in the resource pool 162 can thereby be facilitated. In aspects, the resource pool 162 itself can comprise an extensible markup language (XML)-based database, and/or other data store, and can receive and store the specification language wrapper 144 of multiple clients and/or other machines contributing resources to the set of marketplace clouds 152. In aspects, clouds in the set of marketplace clouds 152 can bid for the set of user-controlled resources 154 offered or contributed by one or more users in the resources pool 162, and the cloud marketplace system 148 can distribute those resources to the highest cloud bidder, for instance, to the cloud offering the greatest payment for use of the set of user-controlled resources 154. Other selection mechanisms for the set of user-controlled resources 154 can be used by the cloud marketplace system 148 to distribute the subject resources to the set of marketplace clouds 152, and/or other destination cloud-based network or networks. It may be noted that in embodiments where the specification language wrapper 144 is encoded in a standardized format such as extensible markup language (XML) and/or other formats, the specification language wrapper 144 can likewise be transmitted to and directly decoded and/or stored by other platforms or services configured to communicate in that format.

Figure 5:
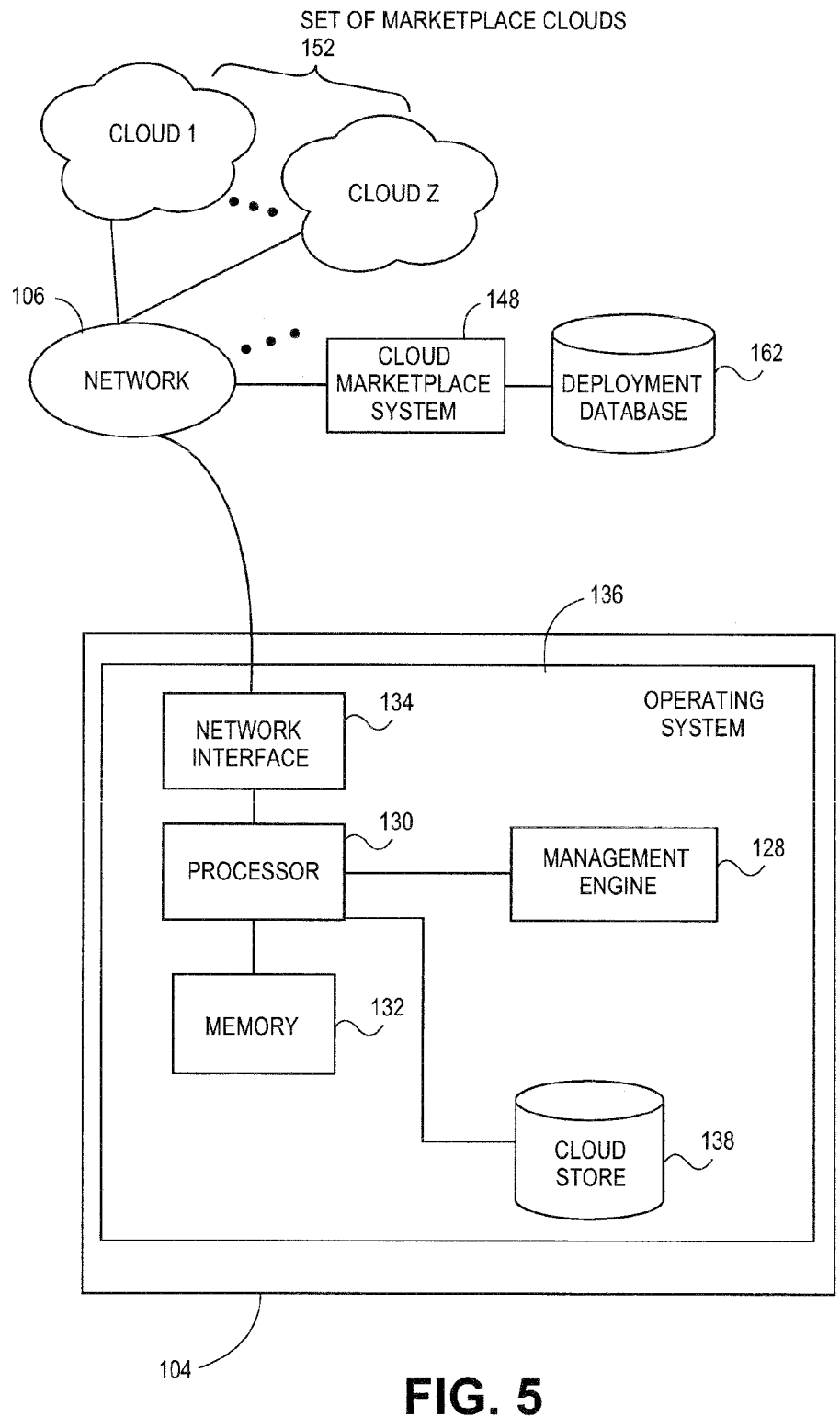
FIG. 5 illustrates an exemplary data structure that can store a specification language wrapper, according to various embodiments.

FIG. 5 illustrates an exemplary diagram of hardware and other resources that can be incorporated in a cloud management system 104 configured to communicate with the client 140, the set of marketplace clouds 152, the cloud marketplace system 148, and/or other entities, services, or resources in network 200 via one or more networks 106 and/or other connections, according to embodiments. In embodiments as shown, the cloud management system 104 can comprise a processor 130 communicating with memory 132, such as electronic random access memory, operating under control of or in conjunction with an operating system 136. The operating system 136 can be, for example, a distribution of the Linux™ operating system, the Unix™ operating system, or other open-source or proprietary operating system or platform. The processor 130 also communicates with a cloud store 138, such as a database stored on a local hard drive, and a management engine 128, to execute control logic and control the operation of virtual machines and other resources in the set of marketplace clouds 152 and/or other clouds or collections of clouds. The processor 130 further communicates with a network interface 134, such as an Ethernet™ or wireless data connection, which in turn communicates with the one or more networks 106, such as the Internet or other public or private networks. Other configurations of the cloud management system 104, associated network connections, and other hardware, software, and service resources are possible. It may be noted that in embodiments, the marketplace engine 150 of the could marketplace system 148, the client 140, and/or other hardware platforms, machines, or engines can comprise the same or similar resources as cloud management system 104, or can be configured with different hardware and software resources.

Figure 6:
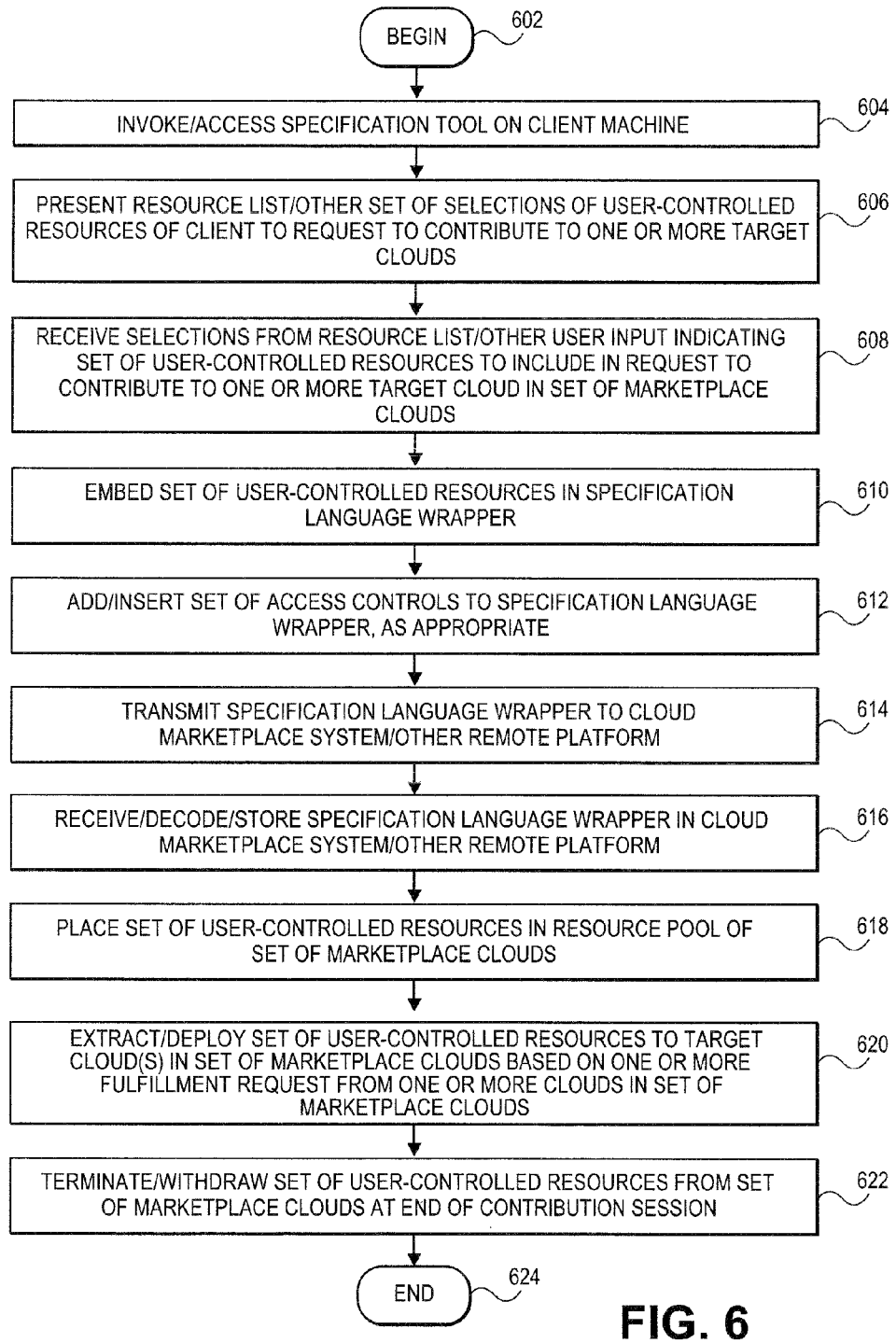
FIG. 6 illustrates a flowchart for processing the receipt, encoding, and delivery of a resource contribution request to a cloud marketplace system, according to various embodiments.

FIG. 6 illustrates a flowchart of overall processing to receive and encapsulate a contribution request 142 in a specification language wrapper 144 and perform related activity, according to various embodiments of the present teachings. In 602, processing can begin. In 604, the specification tool 156 can be invoked and/or instantiated on the client 140, for instance by receiving a user input or command. In 606, the specification tool 156 can present a resource list and/or other set of selections of the resources present on the client 140 to potentially contribute to one or more clouds in the set of marketplace clouds 152. In 608, the specification tool 156 can receive selections from the resource list and/or other user input indicating resources of the client 140 to include in the contribution request 142 to request the delivery or contribution of the resulting set of user-controlled resources 154 to be provided to the set of marketplace clouds 152.

In 610, the specification tool 140 can embed the specification of the set of user-controlled resources 146 to be contributed to the set of marketplace clouds 152 in the specification language wrapper 144. In aspects, the specification tool 140 can embed the specification of set of user-controlled resources 146 in an extensible markup language (XML) wrapper or extractor, as understood by persons skilled in the art, so that the specification language wrapper 144 comprises a self-describing and/or delimited data structure, which in aspects can be directly compatible with, and stored in, extensible markup language (XML)-based databases or data stores. In 612, the set of access controls 164 can be added to or inserted in the specification language wrapper 144, as appropriate. For instance, the set of access controls 164 can comprise limits on the duration or time period in which the set of user-controlled resources 154 will be made available to the set of marketplace clouds. For further instance, the set of access controls 164 can specify boundaries on memory addresses which will not be made accessible to the set of marketplace clouds 152, and/or files or directories of hard disk or other storage which will likewise be made inaccessible to the set of marketplace clouds 152. Other resources in the set of user-controlled resources 154 can be controlled by the set of access controls 164.

In 614, the specification tool 140 can transmit the specification language wrapper 144 to the cloud marketplace system 148 and/or other remote platform or service. In 616, the cloud marketplace system 148 can receive and/or decode the specification language wrapper 144, for instance, by extracting the specification of set of user-controlled resources 146 from an extensible markup language (XML)-based wrapper or extractor, and/or decoding other data structures or objects. In 618, the cloud marketplace system 148 can place the specification of set of user-controlled resources 146 into the resource pool 162 of the set of marketplace clouds 152, indicating that those resources are available to one or more clouds wishing to obtain or use those resources. In 620, the cloud marketplace system 148 can extract and/or deploy the set of user-controlled resources 154 to one or more target clouds in the set of marketplace clouds 152, for instance based on a match to one or more resource fulfillment requests 160 received from the set of marketplace clouds 152. In embodiments, the deployment of the set of user-controlled resources 154 can be performed using other mechanisms than matching the contribution request 142 to the one or more resource fulfillment requests 160, such as, for instance, deploying the set of user-controlled resources 154 directly to a cloud to which those resources had been previously or independently secured or registered.

In 622, the cloud marketplace system 148 can terminate, suspend, and/or otherwise end the delivery of the set of user-controlled resources 154 to the set of marketplace clouds 152 at the end of the contribution session or period, for instance, by detecting the conclusion of a time period for which the set of user-controlled resources 154 are scheduled to be delivered to the set of marketplace clouds 152. In embodiments, the delivery of the set of user-controlled resources 154 can be terminated using other mechanisms or based on other conditions. For instance, the cloud marketplace system 148 can terminate the delivery or contribution of the set of user-controlled resources 154 based on the receipt of user input to spontaneously withdraw the set of user-controlled resources 154 from the set of marketplace clouds 152, and/or by detecting, the violation of the set of access controls 164 in the course of usage of the set of user-controlled resources 154 by the set of marketplace clouds 152. In 624, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which the cloud management system 104 for a particular cloud resides in a single server or platform, in embodiments the cloud management system 104 and associated logic can be distributed among multiple servers, services, or systems. Similarly, while embodiments have been described in which one group of servers within a set of resource servers 108 can provide one component to build a requested set of virtual machines, in embodiments, one group of resource servers can deliver multiple components to populate the requested set of instantiated virtual machines 116, set of virtual machines 178, and/or other machines, entities, services, or resources. For further example, while embodiments have been described in which, in embodiments. Other resources described as singular or integrated can in embodiments be plural or distributed, and resources described as multiple or distributed can in embodiments be combined. The scope of the invention is accordingly intended to be limited only by the following claims.

What is claimed is:

1. A method comprising:
receiving a contribution request comprising an identification of resources of a client machine for contribution to a cloud-based network;
embedding, by a processor, a specification of the resources in a specification language wrapper; and
transmitting the specification language wrapper to a marketplace engine.

2. The method of claim 1, wherein the resources comprise at least one of processor resources, memory resources, storage resources, input/output (I/O) resources, or software resources.

3. The method of claim 1, wherein the specification language wrapper comprises an extensible markup language (XML) wrapper.

4. The method of claim 1, further comprising receiving compensation from the marketplace engine.

5. The method of claim 1, wherein the specification language wrapper is transmitted to the marketplace engine on a secure basis.

6. The method of claim 1, wherein the contribution request to comprises a set of access controls on the resources.

7. The method of claim 1, wherein the receiving a contribution request comprises receiving input from a user of the client machine specifying the resources on the client machine.

8. The method of claim 1, further comprising receiving a request to contribute an updated set of resources to the cloud-based network.

9. A system comprising
an interface to a marketplace engine; and
a processor, coupled to the marketplace engine via the first interface, the processor to:
receive a contribution request comprising an identification of resources of a client machine for contribution to a cloud-based network,
embed a specification of the resources in a specification language wrapper, and
transmit the specification language wrapper to the marketplace engine.

10. The system of claim 9, wherein the resources comprise at least one of processor resources, memory resources, storage resources, input/output (I/O) resources, or software resources.

11. The system of claim 9, wherein the specification language wrapper comprises an extensible markup language (XML) wrapper.

12. The system of claim 9, wherein the processor is further to receive compensation from the marketplace engine.

13. The system of claim 9, wherein the specification language wrapper is transmitted to the marketplace engine on a secure basis.

14. The system of claim 9, wherein the contribution request comprises a set of access controls on the resources.

15. The system of claim 9, wherein the receiving a contribution request comprises receiving input from a user of the client machine specifying the resources on the client machine.

16. The system of claim 9, wherein the processor is further to receive a request to contribute an updated set of resources to the cloud-based network.

17. A system comprising:
a first interface to a client machine;
a second interface to a cloud-based network; and,
a processor, to couple to the client machine via the first interface and the cloud-based network via the second interface, the processor to:
receive a specification language wrapper encoding a specification of resources of the client machine for contribution to the cloud-based network, and
assign the resources to the cloud-based network based on a resource fulfillment request from the cloud-based network.

18. The system of claim 17, wherein the specification language wrapper comprises an extensible markup language (XML) wrapper.

19. The system of claim 17, wherein the resources comprise at least one of processor resources, memory resources, storage resources, input/output (I/O) resources, or software resources.

* * * * *

UNITED STATES PATENT AND TRADEMARK OFFICE
CERTIFICATE OF CORRECTION

PATENT NO. : 8,880,700 B2  
APPLICATION NO. : 12/790294  
DATED : November 4, 2014  
INVENTOR(S) : Ferris et al.

Page 1 of 1

It is certified that error appears in the above-identified patent and that said Letters Patent is hereby corrected as shown below:

In the Claims

In Claim 6, Column 13, Line 23 delete "to";

In Claim 9, Column 13, Line 33 delete "first".

Signed and Sealed this
Twenty-eighth Day of March, 2017

Michelle K. Lee
*Director of the United States Patent and Trademark Office*